(12) United States Patent
Aguayo et al.

(10) Patent No.: US 12,264,263 B2
(45) Date of Patent: Apr. 1, 2025

(54) COMPOSITE COATINGS CONTAINING PHASE CHANGE MATERIALS

(71) Applicants: Matthew Aguayo, Chandler, AZ (US); Aashay Arora, Tempe, AZ (US); Narayanan Neithalath, Chandler, AZ (US)

(72) Inventors: Matthew Aguayo, Chandler, AZ (US); Aashay Arora, Tempe, AZ (US); Narayanan Neithalath, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 936 days.

(21) Appl. No.: 17/372,031

(22) Filed: Jul. 9, 2021

(65) Prior Publication Data

US 2021/0340387 A1    Nov. 4, 2021

Related U.S. Application Data

(63) Continuation of application No. PCT/US2020/013141, filed on Jan. 10, 2020.
(Continued)

(51) Int. Cl.
*C09D 5/26* (2006.01)
*C09D 5/02* (2006.01)
(Continued)

(52) U.S. Cl.
CPC .............. *C09D 5/26* (2013.01); *C09D 5/028* (2013.01); *C09D 7/70* (2018.01); *C09D 133/00* (2013.01); *C09K 5/063* (2013.01); *G01N 25/18* (2013.01)

(58) Field of Classification Search
CPC . C09D 5/26; C09D 7/70; C09D 5/028; C09D 133/00; C09K 5/063; G01N 25/18; F28D 20/023; Y02E 60/14
See application file for complete search history.

(56) References Cited

U.S. PATENT DOCUMENTS

| | | | |
|---|---|---|---|
| 4,747,240 A | | 5/1988 | Voisinet et al. |
| 5,804,297 A | * | 9/1998 | Colvin .................. F28D 20/023 |
| | | | 428/407 |

(Continued)

FOREIGN PATENT DOCUMENTS

CN        102352159 B  *  7/2013

OTHER PUBLICATIONS

Sá et al. "Thermal enhancement of plastering mortars with Phase Change Materials: Experimental and numerical approach" in Energy and Buildings, vol. 49, pp. 16-27, 2012. (Year: 2012).*

(Continued)

*Primary Examiner* — Pamela H Weiss
(74) *Attorney, Agent, or Firm* — SNELL & WILMER L.L.P.

(57) ABSTRACT

Methods and formulations for use of phase change materials (PCMs) as coatings or integrated with building materials are disclosed. A formulation comprises an amount of phase change material, for example a mass fraction of about 0.01 to about 0.50. The PCM materials may be applied as a surface treatment such as paint, for example in order to provide improved thermal regulation to a building or a portion thereof.

14 Claims, 13 Drawing Sheets

Interior Wall Layering

Exterior Wall Layering

Related U.S. Application Data

(60) Provisional application No. 62/791,299, filed on Jan. 11, 2019.

(51) Int. Cl.
    *C09D 7/40*     (2018.01)
    *C09D 133/00*     (2006.01)
    *C09K 5/06*     (2006.01)
    *G01N 25/18*     (2006.01)

(56) References Cited

U.S. PATENT DOCUMENTS

| | | | |
|---|---|---|---|
| 7,166,355 B2 | 1/2007 | Jahns et al. | |
| 2013/0034732 A1 | 2/2013 | Parker et al. | |
| 2013/0298991 A1* | 11/2013 | Parker | C04B 18/021 136/259 |
| 2016/0168439 A1* | 6/2016 | Ayambem | C09K 5/063 428/484.1 |
| 2017/0167133 A1* | 6/2017 | Sidheswaran | C09K 5/063 |

OTHER PUBLICATIONS

Fort et al. "Cement-Lime Plaster with PCM Addition—a Perspective Material for Moderation of Interior Climate" in Key Engineering Materials, vol. 707, pp. 43-50, 2016. (Year: 2016).*

Lucolano et al. "Fibre-reinforced lime-based mortars: A possible resource for ancient masonry restoration" in Construction and Building Materials, vol. 38, Jan. 2013. (Year: 2013).*

CN102352159B MT (Year: 2013).*

PCT; International Search Report and Written Opinion in the PCT Application No. PCT/US2020/13141 dated May 20, 2020.

E.K. Asimakopoulou, D.I. Kolaitis, M.A. Founti, Fire safety aspects of PCM-enhanced gypsum plasterboards: An experimental and numerical investigation, Fire Saf. J. 72 (2015) 50-58. doi:10.1016/j.firesaf.2015.02.004.

L.F. Cabeza, C. Castellon, M. Nogues, M. Medrano, R. Leppers, O. Zubillaga, Use of microencapsulated PCM in concrete walls for energy savings, Energy Build. 39 (2007) 113-119. doi:10.1016/j.enbuild.2006.03.030.

F. Kuznik, J. Virgone, Experimental assessment of a phase change material for wall building use, Appl. Energy. 86 (2009) 2038-2046. doi:10.1016/j.apenergy.2009.01.004.

M.S. McLaggan, R.M. Hadden, M. Gillie, Flammability assessment of phase change material wall lining and insulation materials with different weight fractions, Energy Build. 153 (2017) 439-447. doi:10.1016/j.enbuild.2017.08.012.

M.S. McLaggan, R.M. Hadden, M. Gillie, Fire Performance of Phase Change Material Enhanced Plasterboard, Fire Technol. 54 (2018) 117-134. doi:10.1007/s10694-017-0675-x.

J. Kosny, N. Shukla, A. Fallahi, Cost Analysis of Simple Phase Chnage Material-Enhanced Building Envelopes in Southern U.S. Climates, United States, 2013. https://www.osti.gov/biblio/1219890.

R. Baetens, B.P. Jelle, A. Gustavsen, Phase change materials for building applications: A state-of-the-art review, Energy Build. 42 (2010) 1361-1368. doi:10.1016/j.enbuild.2010.03.026.

M.F. Demirbas, Thermal Energy Storage and Phase Change Materials: An Overview, Energy Sources Part B Econ. Plan. Policy. 1 (2006) 85-95. doi:10.1080/009083190881481.

A.M. Khudhair, M.M. Farid, A review on energy conservation in building applications with thermal storage by latent heat using phase change materials, Energy Convers. Manag. 45 (2004) 263-275. doi:10.1016/S0196-8904(03) 00131-6.

F. Kuznik, D. David, K. Johannes, J.-J. Roux, A review on phase change materials integrated in building walls, Renew. Sustain. Energy Rev. 15 (2011) 379-391. doi:10.1016/j.rser.2010.08.019.

A. Pasupathy, R. Velraj, R.V. Seeniraj, Phase change material-based building architecture for thermal management in residential and commercial establishments, Renew. Sustain. Energy Rev. 12 (2008) 39-64. doi:10.1016/j.rser.2006.05.010.

F. Souayfane, F. Fardoun, P.-H. Biwole, Phase change materials (PCM) for cooling applications in buildings: A review, Energy Build. 129 (2016) 396-431. doi:10.1016/j.enbuild.2016.04.006.

ASTM C926-18b. Standard Specification for Application of Portland Cement-Based Plaster, ASTM Int. West Conshohocken PA 2018. (2018).

ASTM C475 / C475M—17. Standard Specification for Joint Compound and Joint Tape for Finishing Gypsum Board, ASTM Int. West Conshohocken PA 2017. (2017).

ASTM International, West Conshohocken, PA (2018), ASTM E1269—11. Standard Test Method for Determining Specific Heat Capacity by Differential Scanning Calorimetry, (2018).

A. Arora, M. Aguayo, H. Hansen, C. Castro, E. Federspiel, B. Mobasher, N. Neithalath, Microstructural packing- and theology-based binder selection and characterization for Ultra-high Performance Concrete (UHPC), Cem. Concr. Res. 103 (2018) 179-190. doi:10.1016/j.cemconres.2017.10.013.

M. Aguayo, S. Das, A. Maroli, N. Kabay, J.C.E. Mertens, S.D. Rajan, G. Sant, N. Chawla, N. Neithalath, The influence of microencapsulated phase change material (PCM) characteristics on the microstructure and strength of cementitious composites: Experiments and finite element simulations, Cem. Concr. Compos. 73 (2016) 29-41. doi:10.1016/j.cemconcomp.2016.06.018.

J. Giro-Paloma, G. Oncins, C. Barreneche, M. Martinez, A.I. Fernández, L.F. Cabeza, Physico-chemical and mechanical properties of microencapsulated phase change material, Appl. Energy. 109 (2013) 441-448. doi:10.1016/j.apenergy.2012.11.007.

S. Barbero, M. Dutto, C. Ferrua, A. Pereno, Analysis on existent thermal insulating plasters towards innovative applications: Evaluation methodology for a real cost-performance comparison, Energy Build. 77 (2014) 40-47. doi:10.1016/j.enbuild.2014.03.037.

O. Kaynakli, A review of the economical and optimum thermal insulation thickness for building applications, Renew. Sustain. Energy Rev. 16 (2012) 415-425. doi:10.1016/j.rser.2011.08.006.

O. Kaynakli, A study on residential heating energy requirement and optimum insulation thickness, Renew. Energy. 33 (2008) 1164-1172. doi:10.1016/j.renene.2007.07.001.

T.M.I. Mahlia, B.N. Taufiq, Ismail, H.H. Masjuki, Correlation between thermal conductivity and the thickness of selected Insulation materials for building wall, Energy Build. 39 (2007) 182-187. doi:10.1016/j.enbuild.2006.06.002.

A.M. Papadopoulos, State of the art in thermal insulation materials and aims for future developments, Energy Build. 37 (2005) 77-86. doi:10.1016/j.enbuild.2004.05.006.

A. Ucar, F. Balo, Determination of the energy savings and the optimum insulation thickness in the four different Insulated exterior walls, Renew. Energy. 35 (2010) 88-94. doi:10.1016/j.renene.2009.07.009.

A.M. Borreguero, J.L. Valverde, J.F. Rodriguez, A.H. Barber, J.J. Cubillo, M. Carmona, Synthesis and characterization of microcapsules containing Rubitherm®RT27 obtained by spray drying, Chem. Eng. J. 166 (2011) 384-390. doi:10.1016/j.cej.2010.10.055.

K. Qiu, W. Li, G. Song, X. Chu, G. Tang, Microencapsulated n-octadecane with different methylmethacrylate-based copolymer shells as phase change materials for thermal energy storage, Energy. 46 (2012) 188-199. doi:10.1016/j.energy.2012.08.037.

J.-F. Su, Z. Huang, L. Ren, High compact melamine-formaldehyde microPCMs containing n-octadecane fabricated by a two-step coacervation method, Colloid Polym. Sci. 285 (2007) 1581-1591. doi:10.1007/s00396-007-1729-2.

Stucco', Wikipedia, Jan. 2, 2019 (Feb. 2, 2019), [retrieved Mar. 18, 2020 (Mar. 18, 2020) via <https://en.wikipedia.org/w/index.php?title=Stucco&oldid=876485062>].

* cited by examiner

COMPOSITE COATINGS CONTAINING PHASE CHANGE MATERIALS

CROSS-REFERENCE TO RELATED APPLICATIONS

This application is a continuation of PCT Patent Application No. PCT/US2020/013141 filed Jan. 10, 2020 and entitled "COMPOSITE COATINGS CONTAINING PHASE CHANGE MATERIALS." PCT Patent Application No. PCT/US2020/013141 is a non-provisional of, and claims priority to, U.S. Provisional Application No. 62/791,299 filed Jan. 11, 2019 and entitled "COMPOSITE COATINGS CONTAINING PHASE CHANGE MATERIALS." Each of the foregoing applications is hereby incorporated by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

FEDERALLY SPONSORED RESEARCH OR DEVELOPMENT

This invention was made with government support under contract No. 1130028 awarded by the National Science Foundation. The government has certain rights in the invention.

TECHNICAL FIELD

The present disclosure relates to phase change materials (PCMs), and in particular to PCMs incorporated into base coating materials for use in building construction practices.

BACKGROUND

The prospect of PCMs incorporated into base coating materials as a legitimate alternative to traditional base coating materials shows promise of many advantages including energy savings, reducing heating, ventilation and air conditioning (HVAC) loads, increasing thermal mass, reducing internal temperature fluctuations, and enabling a more desirable thermal environment. Accordingly, improved base coating materials, systems, and methods are desirable.

SUMMARY

Formulations, systems, and methods for PCM-composite coatings are disclosed herein. In an exemplary embodiment, a formulation for phase change material (PCM)-composite coating comprising an amount of phase change material having a mass fraction range of about 0.01 to about 0.50 comprises organic material, inorganic material, microencapsulated PCM, and bulk PCM.

In another exemplary embodiment, a system for determining a thermal performance of a formulation for PCM-composite coating comprises a temperature-controlled environmental chamber; an interior wall envelope element; a data acquisition unit; and a plurality of wall layers.

In another exemplary embodiment a method for treating a building surface with PCM comprises selecting the building surface to be treated; determining, for the building surface: (i) an amount of PCM to utilize per unit area, and (ii) a ratio of PCM to at least one other component of a treatment material; mixing the PCM with the at least one other component to form the treatment material; and applying the treatment material to the building surface to modify at least one thermal characteristic of the building surface.

The contents of this summary section are intended as a simplified introduction to the disclosure and are not intended to be used to limit the scope of any claim.

BRIEF DESCRIPTION OF THE DRAWINGS

With reference to the following description and accompanying drawings.

DETAILED DESCRIPTION

Figure 1:
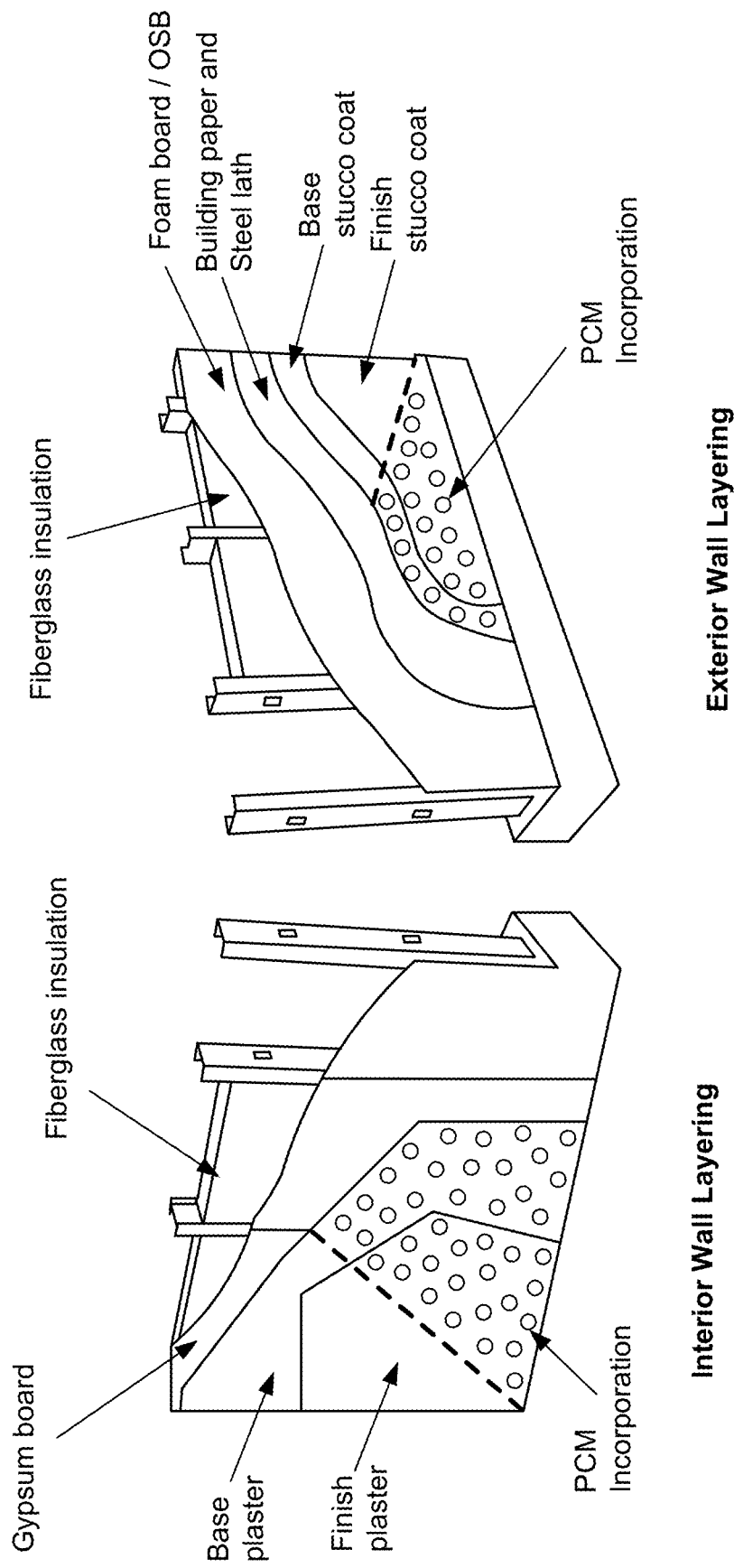
FIG. 1 illustrates an exemplary interior and exterior layered wall section incorporating PCMs in accordance with various exemplary embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, traditional insulating materials for manipulating the thermal environment of a building, as well as traditional approaches for mixture proportioning of traditional coating materials, and/or the like may not be described in detail herein. It should be noted that many alternative or additional insulating materials and/or structural or coating materials may be present in a PCM-composite system, related methods, and/or products arising therefrom.

Principles of the present disclosure contemplate new PCM-composite coatings which can self-regulate and self-adapt, which allows these coatings to help manipulate and maintain a desired thermal environment for new construction and retrofit projects with existing insulation. By providing methods to mix, utilize, and apply PCM-composite coatings, exemplary embodiments disclose cost-saving, renewable energy solutions. Disclosed herein are formulations for PCM-composite coatings, including specified mass proportion ranges of each base coating material constituent and the range for the specified PCM-to-base coating material ratio. Also disclosed are various methods for preparation and use of such materials and coatings. These PCM-composite coatings are easily applicable for users and ensure that users get the aesthetic and wall covering features expected from a coating material, but also have an advanced temperature-regulating feature that is superior to traditional insulating materials.

Traditional insulating materials for manipulating the thermal environment of a building include, but are not limited to, fiberglass insulation, foam board, mineral wood, and cork. The high thermal resistance (R-value) or low thermal conductivity of these materials enables them to lower the rate at which heat may pass through them. These materials are often limited to new construction or only placed within the attics of existing buildings. Traditional coating materials, including but not limited to paint, stucco, and plaster, are typically applied to buildings only for aesthetics or wall covers. In contrast, the present disclosure contemplates PCM-composite coatings' abilities to manipulate and maintain a desired thermal environment. Besides possessing the desired features of traditional coating materials, exemplary PCM-composite coatings include a thermal energy storing component. Incorporating PCM microcapsules into the base layer (e.g., stucco, plaster, and paint) and coating building envelopes with the PCM-composite coating can increase the thermal mass of the building envelopes. Increasing the thermal mass of building envelopes can delay heat transfer rates. Further, while traditional insulating materials control the rate of heat that passes between them, the present disclosure contemplates storing heat at a desired temperature for human thermal comfort.

Exemplary base coating materials suitable for use in a formula with PCM may include stucco, plaster, and paint. However, PCM components may be included in any suitable materials and/or composite structures, as desired, in order to achieve a desired thermal effect or effects.

An exemplary PCM-composite coating includes stucco. As used herein, stucco is comprised of portland cement, fly ash, clay, lime, aggregate (lightweight silica sand), and fibers (steel, polymer, glass, and/or natural). However, it will be appreciated that any suitable variety of stucco may be utilized, as desired. As used herein, PCM is comprised of a phase change material (organic or inorganic). Further, the PCM is contained within a capsule made of a polymer material or natural material (pumice, expanded shale, expanded clay, perlite, and/or silica). An exemplary embodiment specifies the mass fraction range of stucco and water, and PCM-to-stucco ratio based on mass for the final PCM-stucco composite coating. An exemplary embodiment includes mass fraction ranges of stucco between 0.60-0.90, water between 0.10-0.40, and PCM-to-stucco and water ratio between 0.01-0.40. Water is mixed into the stucco until a uniform consistency is achieved, and PCM is then added and mixed until a uniform consistency is achieved throughout. However, it will be appreciated that any suitable ratios may be utilized, as desired.

An additional exemplary embodiment includes incorporating PCMs into stucco at a PCM-to-stucco and water ratio of 0.14. The composite PCM-stucco coating mixture contains a stucco mass fraction of 0.70, a water mass fraction of 0.18, and a PCM mass fraction of 0.12. These mass fraction ranges achieve a similar consistency as traditional stucco. However, it will be appreciated that any suitable ratios may be utilized, as desired.

An exemplary PCM-composite coating includes plaster. As used herein, plaster is comprised of calcium sulfate, calcium carbonate, mica, and clay. However, it will be appreciated that any suitable variety of plaster may be utilized, as desired. As used herein, PCM is comprised of a phase change material (organic or inorganic). Further, the PCM is contained within a capsule made of a polymer material or natural material (pumice, expanded shale, expanded clay, perlite, and/or silica). The embodiment includes mass fraction ranges of plaster between 0.35-0.60; water between 0.40-0.65; and PCM-to-plaster and water ratio between 0.01-0.50. Water is mixed into the plaster until a uniform consistency is achieved, and PCM is then added and mixed until a uniform consistency is achieved throughout.

An additional exemplary embodiment includes incorporating PCMs into plaster at a PCM-to-plaster and water ratio of 0.41. The composite PCM-plaster coating mixture contains a plaster mass fraction of 0.32, a water mass fraction of 0.39, and a PCM mass fraction of 0.29. These mass fraction ranges achieve a similar consistency as traditional plaster. However, it will be appreciated that any suitable ratios may be utilized, as desired.

An exemplary PCM-composite coating includes paint (e.g., latex-based, water-based, etc.). However, it will be appreciated that any suitable variety of paint may be utilized, as desired. As used herein, latex-based paint is comprised of binder (polymer solids), filler, pigment, and water. Further, microencapsulated PCM is comprised of a phase change material (organic or inorganic) contained within a capsule made of a polymer material. The embodiment includes mass fraction ranges of total polymer solids between 0.25-0.60; water between 0.40-0.75; and PCM-to-paint ratio between 0.01-0.40. Water is mixed into the paint until a uniform consistency is achieved, and PCM is then added and additional water is added and mixed until a uniform consistency is achieved throughout.

An additional exemplary embodiment includes incorporating PCMs into latex-based paint at an initial polymer solids fraction of 0.41 and a water fraction of 0.59. Additional water is added at a mass fraction of 0.28 and mixed into the base coating material until a uniform consistency is achieved. PCM is then added at a PCM-to-paint ratio of 0.33. This ratio incorporates PCM at a mass fraction of 0.25 into the base coating material and additional water is added at a mass fraction of 0.28 and is mixed until a uniform consistency is achieved. The total polymer solids mass fraction for the PCM-paint composite coating mix is 0.44 and the total water mass fraction is 0.56. These mass fraction ranges achieve a similar consistency as traditional latex-based paint. However, it will be appreciated that any suitable ratios may be utilized, as desired.

In a next step after preparation of the PCM-composite coatings, conventional paint and finish tools may be employed to apply the coatings to a substrate. These tools include, but are not limited to, brushes, rollers, putty/joint knives, knives, scrapers, shaver blades, electric airless sprayers, hand-held sprayers, pressure washers, and texture sprayers.

With reference now to FIGS. 1 through 12, in various exemplary embodiments, principles of the present disclosure contemplate integration of PCMs into various building components, surface treatments, and/or the like. For example, an exemplary formulation for PCM coating may comprise an amount of PCM having a mass fraction range of about 0.01 to about 0.50, the formulation comprising organic material, inorganic material, microencapsulated phase change materials, and/or bulk phase change materials, together with approaches for operation and results thereof. In one exemplary embodiment, the formulation may comprise an amount of stucco having a mass fraction range of about 0.60 to about 0.90. In another exemplary embodiment, the formulation may comprise an amount of plaster having a mass fraction range of about 0.35 to about 0.60. In another exemplary embodiment, the formulation may comprise an amount of paint having a mass fraction range of about 0.25 to about 0.60. The paint may be acrylic latex-based paint. The formulation may further comprise an amount of water having a mass fraction range of about 0.10 to about 0.75.

In one exemplary embodiment, as shown in FIG. 1, the formulation may comprise PCM-composite coating incorporated into organic material, such as a base plaster coating and a finish plaster coating. The first layer of a wall may include inorganic material, such as fiberglass insulation surrounding metal beams. Gypsum board is then affixed on the outside of the wall, and is coated with the base plaster incorporated with PCM-composite coating. The finish plaster incorporated with PCM-composite is then coated on the outside as a final layer.

In another exemplary embodiment, also seen in FIG. 1, the formulation may comprise a PCM-composite coating incorporated into organic material, such as a base stucco coat and a finish stucco coat. The first layer of a wall may include inorganic material, such as fiberglass insulation surrounding metal beams. Foam board, oriented strand board (OSB), and/or the like is then affixed on the outside of the wall and is layered with building paper and steel lath. The building paper and steel lath are coated with a base stucco coat incorporated with PCM-composite coating. The finish stucco coat incorporated with PCM-composite may then be coated on the outside as a final layer. Additionally, other thermal coatings, such as reflective paints, absorbent paints, and/or the like may be applied to the finished stucco.

Figure 2:
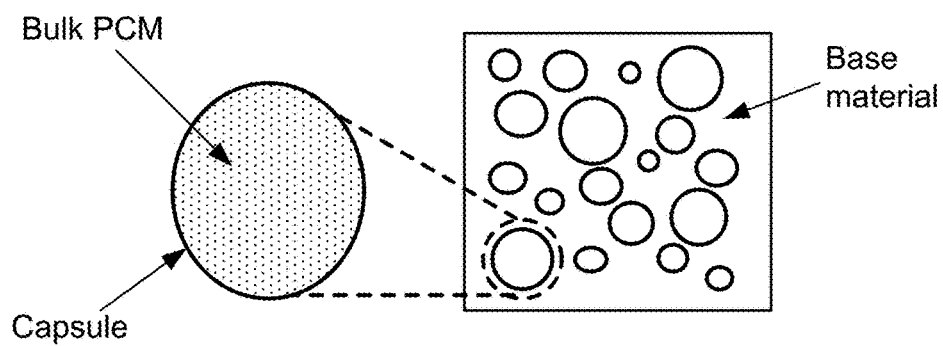
FIG. 2 illustrates a PCM-composite coating with dispersed PCM throughout the base material in accordance with various exemplary embodiments.

With reference now to FIG. 2, in various exemplary embodiments a base material may be combined with PCMs. For example, a PCM-composite coating with dispersed PCMs throughout the base material may be utilized to coat an interior and/or exterior surface of a building. Bulk PCMs may comprise organic and/or inorganic material. The PCMs may comprise individual microcapsules. The PCMs may comprise a microencapsulated powder. The PCMs may comprise a cake. The PCMs may comprise a slurry. The PCM microcapsules may be spherical in shape without agglomerations. Agglomerated PCM microcapsules may negatively impact the microstructure and properties of PCM-composite. The individual PCM microcapsules may allow for a uniform dispersion within the PCM-composite coating.

Figure 3:
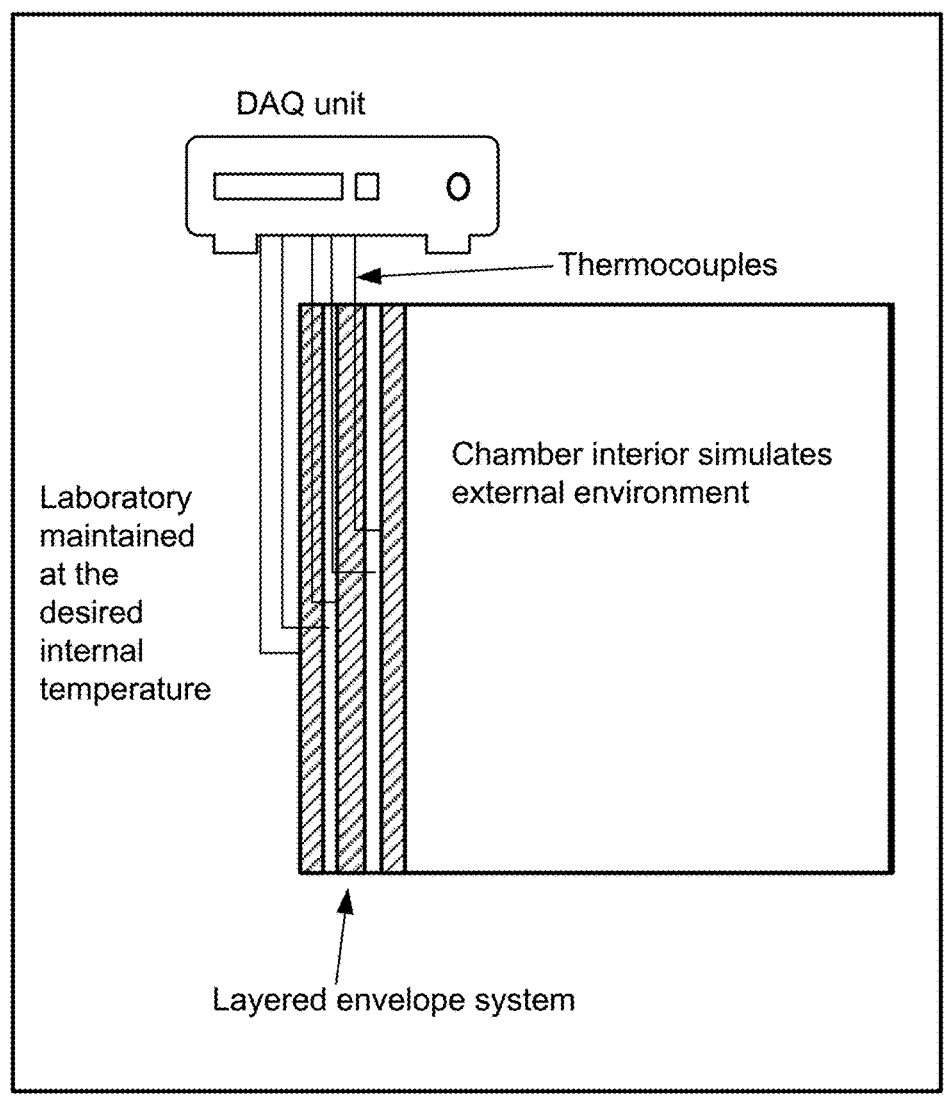
FIG. 3 illustrates a schematic of a layered wall system within an interior chamber simulating the desired external environment for a specific location and time, in accordance with an exemplary embodiment.

With reference now to FIG. 3, a schematic of a system 300 for determining a thermal performance of a formulation for phase change material-composite coating is depicted. The system 300 may comprise a temperature-controlled environmental chamber 310, an interior wall envelope element 320, a DAQ unit 330, and a plurality of wall layers 340.

The temperature-controlled environmental chamber 310 may be configured to simulate a desired external environment. For example, the temperature-controlled environmental chamber 310 may simulate a temperature of a hot summer day. The DAQ unit 330 may be configured to measure temperature at various locations throughout the system 300. For example, the DAQ unit 330 may include thermocouples to measure the layers of the plurality of wall layers 340. The plurality of wall layers 340 may be configured to be simultaneously subjected to the same environmental conditions. For example, multiple types of PCM-composite coating may be subjected to the same environmental conditions at the same time. The efficiency of multiple types of PCM-composite coating may thus be measured at once.

Figure 4A:
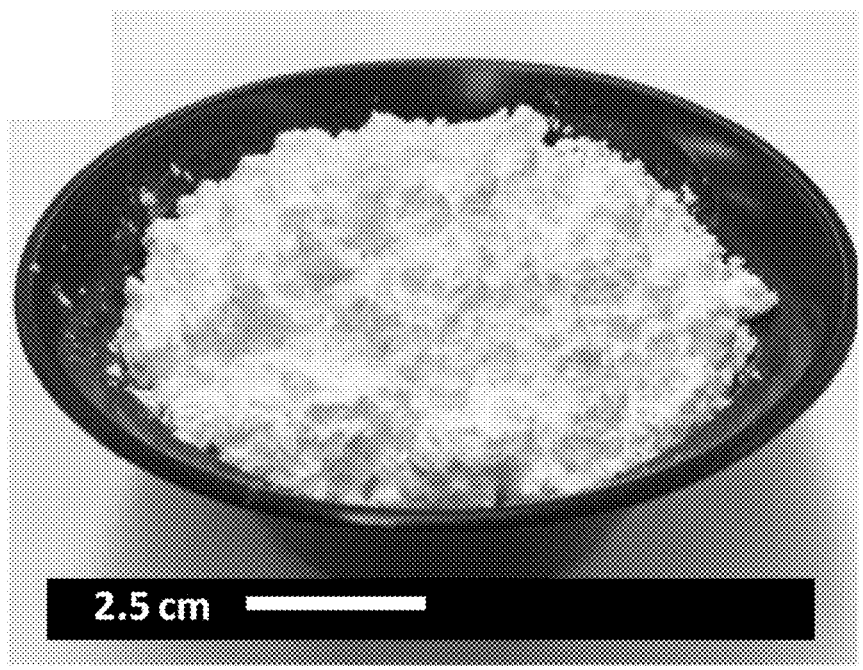
FIGS. 4A, 4B, and 4C illustrate exemplary microencapsulated PCM powder and individual microcapsules in accordance with various embodiments.
Figure 4B:
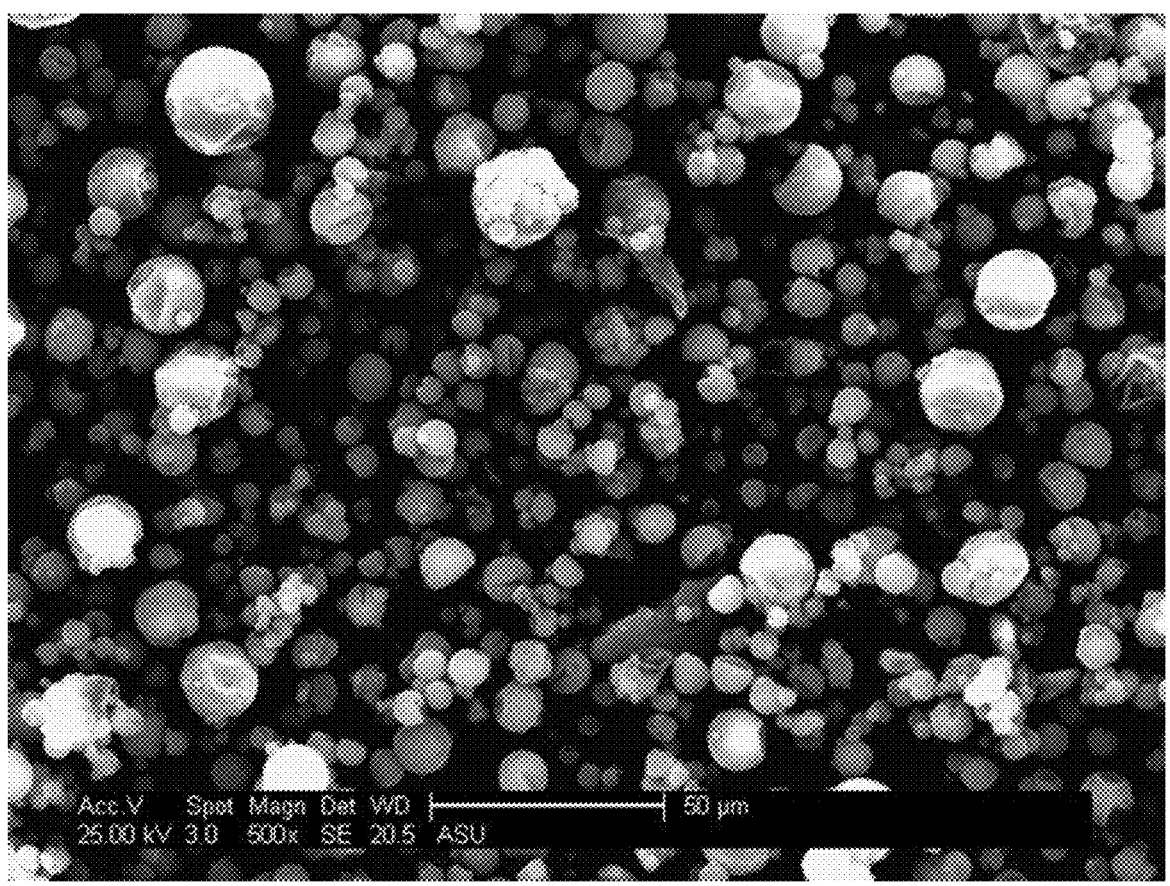
Figure 4C:
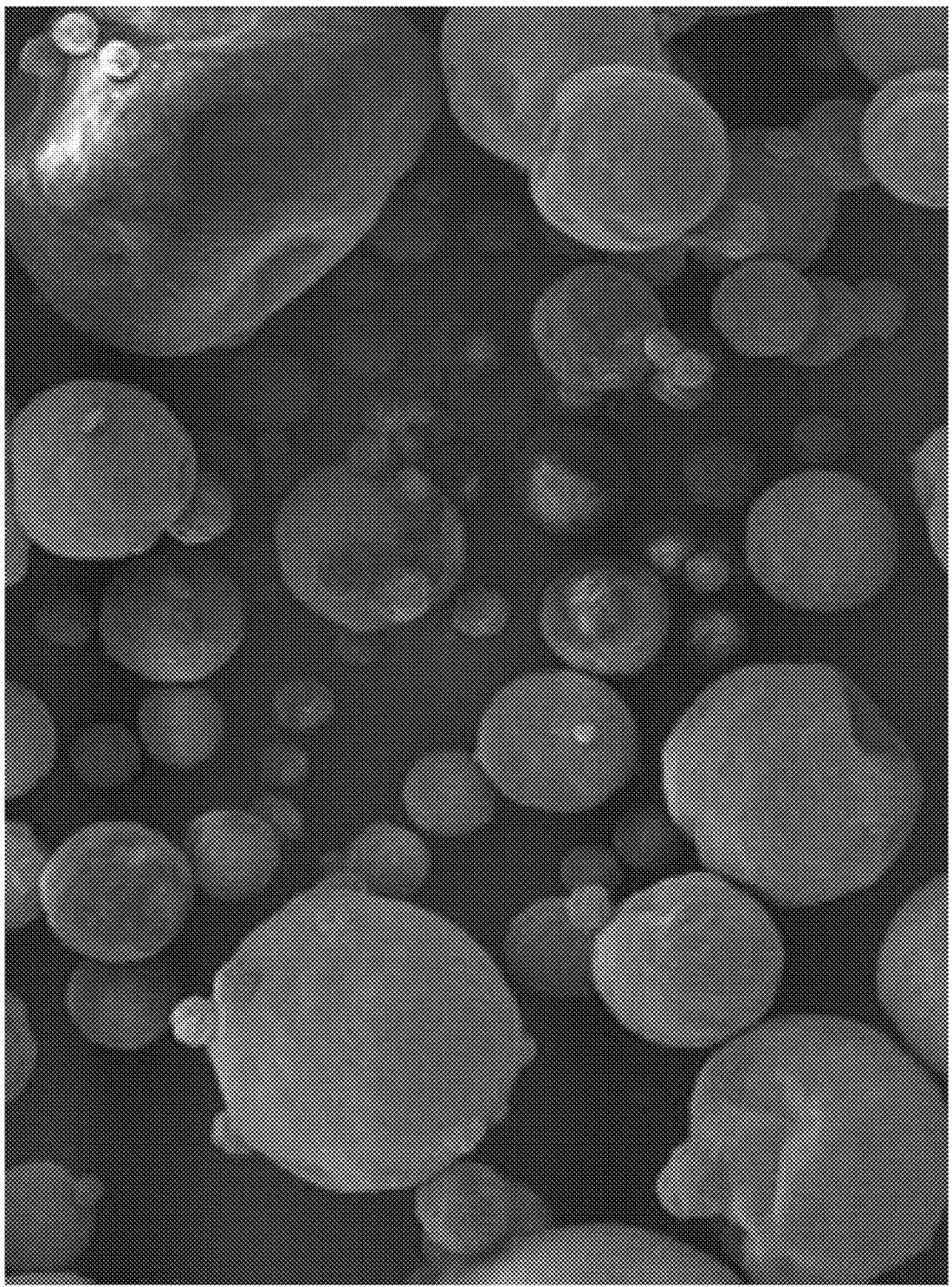

With reference now to FIGS. 4A through 4C, in one exemplary embodiment, PCM microcapsules may be configured to have a phase transition temperature of about 24 degrees Celsius. The PCM microcapsules may be configured to have a median particle size of about 20 µm. In another exemplary embodiment, the PCM microcapsules may be configured to have a phase transition temperature of about 35 degrees Celsius. The PCM microcapsules may be configured to have a median particle size of about 50 µm. However, PCM microcapsules having any suitable phase transition temperature may be utilized, for example a phase transition temperature of above about 24 degrees Celsius and below about 40 degrees Celsius. Additionally, PCM microcapsules having any suitable median particle size may be utilized, for example a median particle size of between about 10 µm and about 100 µm.

Exemplary formulations for PCM-composite coating may be configured to be applied to a plurality of wall layers. The thermal performance of the formulation for PCM-composite coating may be configured to be measured at a range of temperatures. The PCM-composite coatings may undergo a solid-to-liquid and/or liquid-to-solid phase transition. A preferred target thermal energy storage capacity may be desired. To that end, certain amounts of PCM microcapsules may be added to the base coating to achieve a thermal energy storage target. The preferred thermal energy storage target may be measured, for example in kilojoules per square meter. In one exemplary embodiment, a user may prefer a PCM-paint coating with a thermal energy storage target of about 284 kilojoules per square meter. Depending on the type of PCM microcapsule used, in order to achieve the desired thermal energy storage target, the PCM-paint coating may contain about 1281 grams of PCM microcapsules with a phase transition temperature of about 24 degrees Celsius, or about 850 grams of PCM microcapsules with a phase transition temperature of about 35 degrees Celsius, or another suitable amount of PCM microcapsules having a suitable phase transition temperature.

In another exemplary embodiment, a user may prefer a PCM-paint coating with a thermal energy storage target of about 568 kilojoules per square meter. Depending on the type of PCM microcapsule used, in order to achieve the desired thermal energy storage target, the PCM-paint coating may contain about 2551 grams PCM microcapsules with a phase transition temperature of about 24 degrees Celsius, or about 1701 grams of PCM microcapsules with a phase transition temperature of about 35 degrees Celsius, or another suitable amount of PCM microcapsules having a suitable phase transition temperature.

Figure 5:
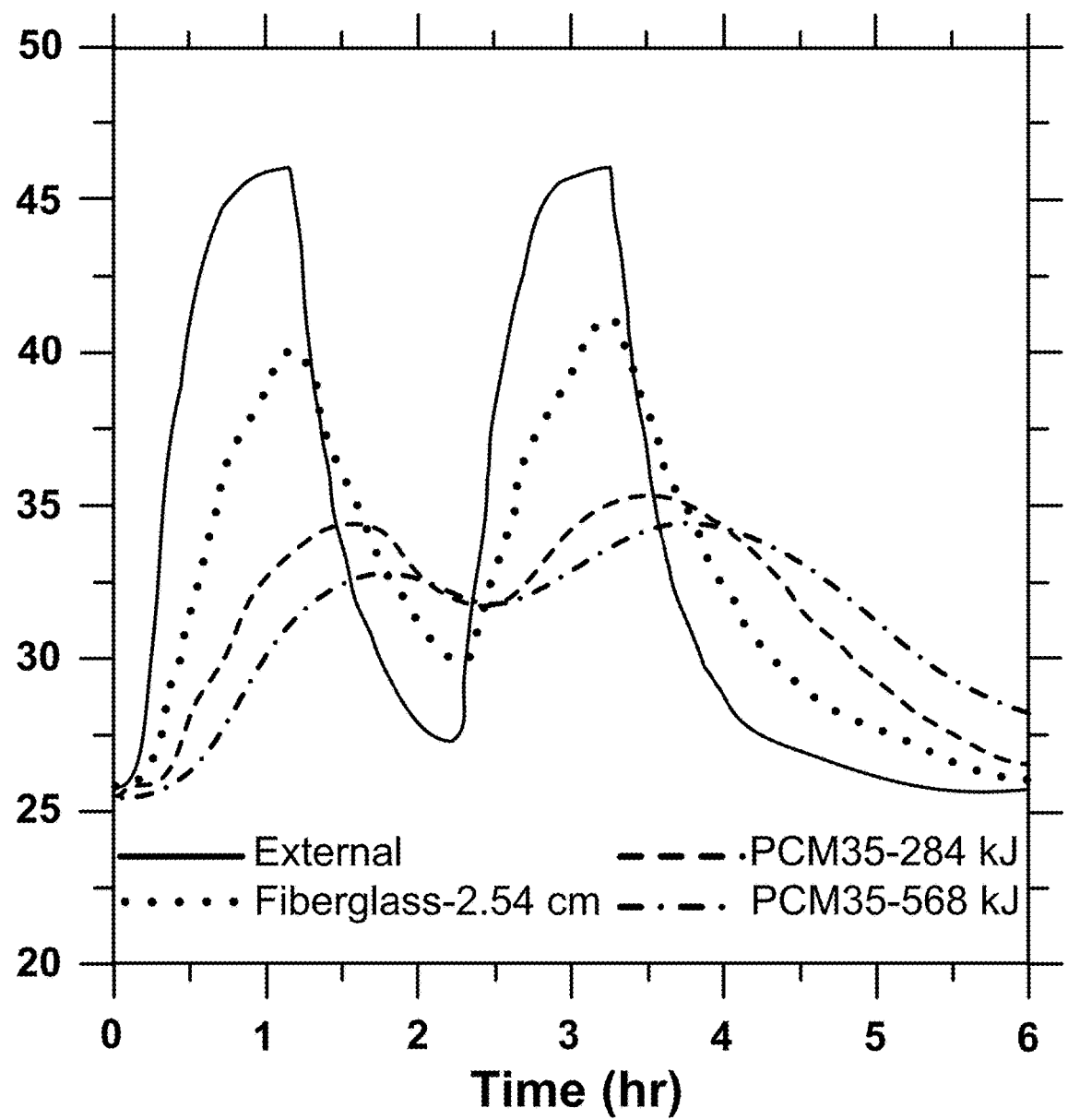
FIG. 5 illustrates thermal performance of exemplary PCM products in accordance with various exemplary embodiments.

Turning now to FIG. 5, it can be seen that exemplary PCM-treated surfaces and/or PCM-impregnated materials provide a meaningful amount of thermal regulation and/or insulation. PCM-treated surfaces and PCM-impregnated materials may provide thermal regulation by reducing and delaying the peak temperature compared to a traditional insulative material, such as fiberglass insulation. For example, FIG. 5 shows how a layer of PCM microcapsules with a phase transition temperature of about 35 degrees Celsius and a thermal energy storage target of about 284 kilojoules can significantly reduce the peak temperature by more than 40 percent and delay the peak temperature to a later time. Further, by doubling this layer of PCM microcapsules with a phase transition temperature of about 35 degrees Celsius and a thermal energy storage target of about 568 kilojoules, the effects may be even more pronounced. This may demonstrate the ability of PCM-impregnated coatings to flatten the cyclic thermal loads that a building may be subjected to.

Figure 6:
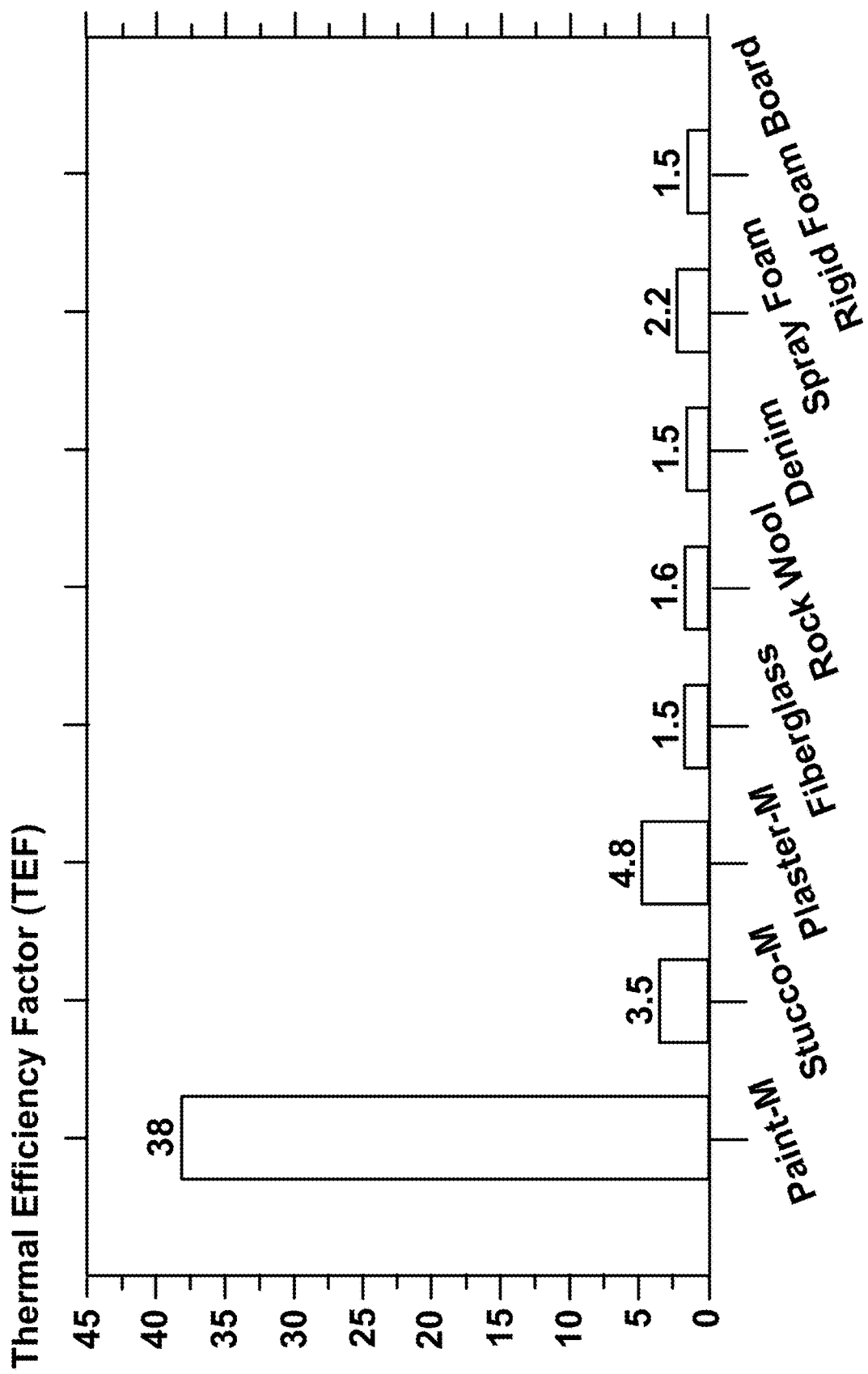
FIG. 6 illustrates thermal efficiency characteristics of exemplary PCM products in accordance with various exemplary embodiments.

Similarly, FIG. 6 shows that exemplary treated surfaces and materials offer desirable thermal efficiency factors (TEF). As disclosed, the TEF is a normalized metric for comparison of PCM-treated surfaces and PCM-impregnated materials with conventional insulative materials. A higher value of TEF implies a higher ability of the material to maintain a constant temperature in a building. Based on the R-value and unit thickness of different materials, the TEF of PCM-coatings is higher than traditional commercially available insulating materials, as coatings are inherently less thick than traditional commercially available insulating materials.

Figure 7A:
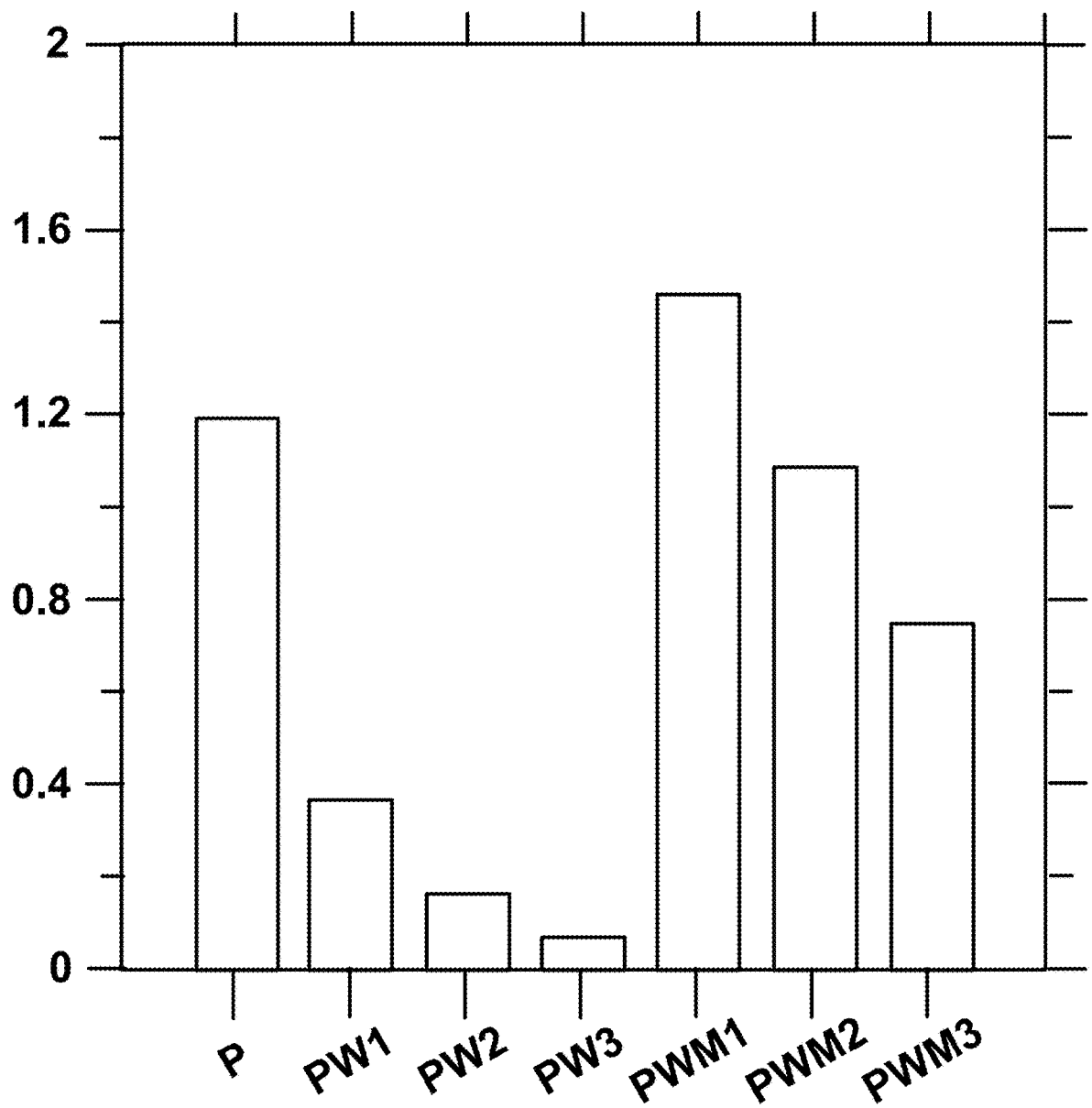
FIG. 7A illustrates viscosity of exemplary PCM-paint mixtures in accordance with various exemplary embodiments.
Figure 7B:
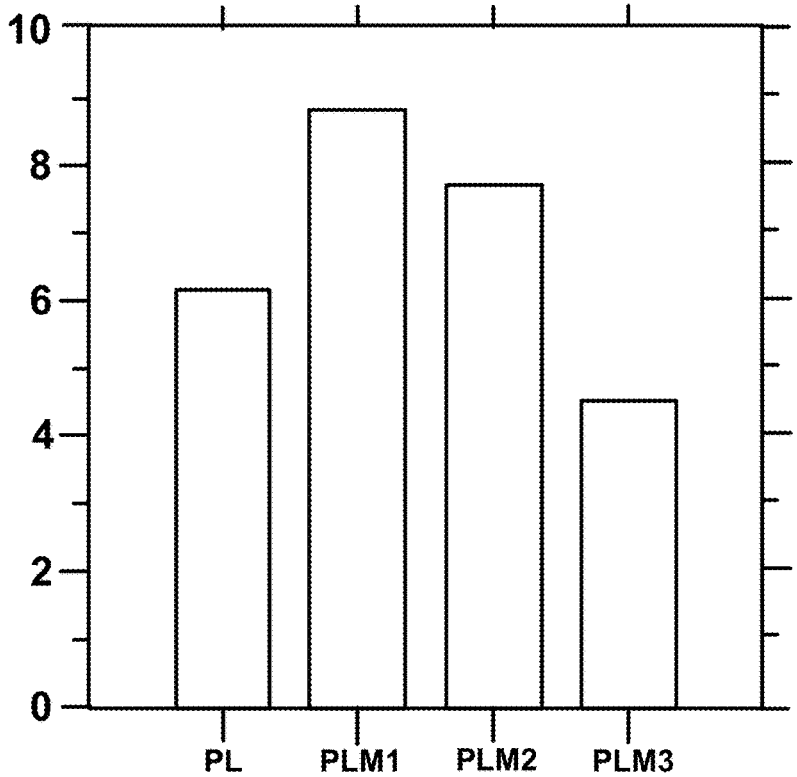
FIG. 7B illustrates viscosity of exemplary PCM-plaster mixtures in accordance with various exemplary embodiments.
Figure 7C:
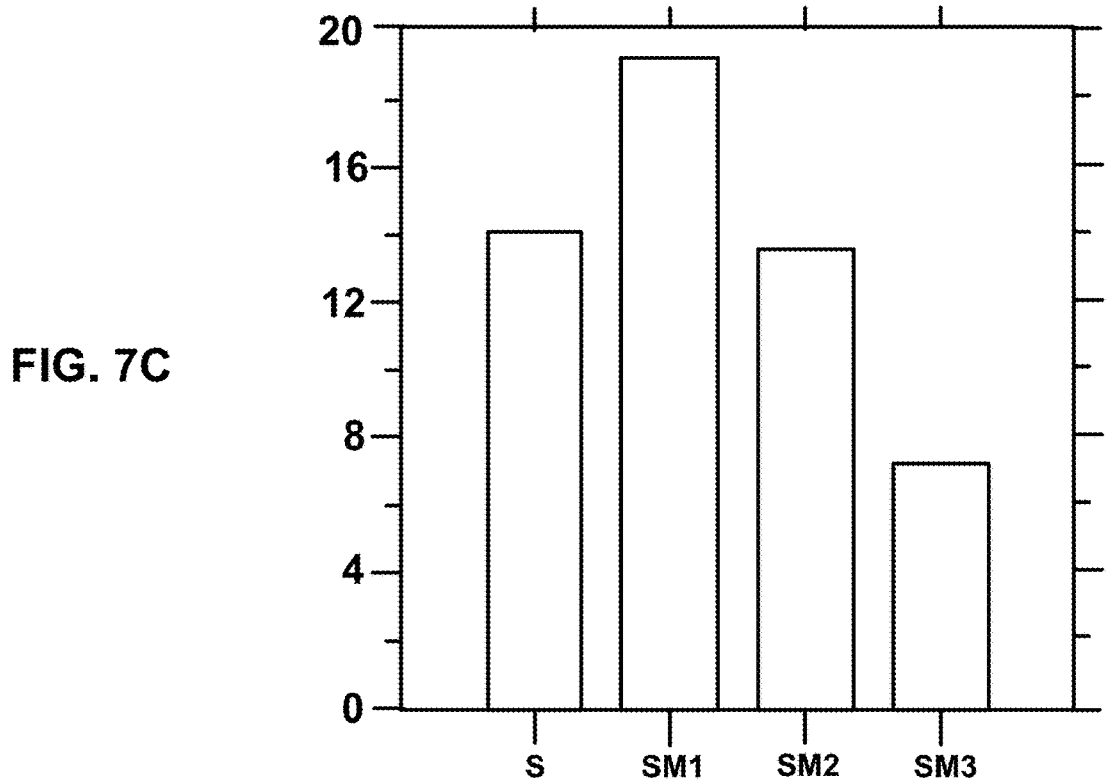
FIG. 7C illustrates viscosity of exemplary PCM-stucco mixtures in accordance with various exemplary embodiments.

Yet further, FIGS. 7A, 7B, and 7C illustrate that, in accordance with various exemplary embodiments and methods, appropriate amounts of PCMs may be included in paint, plaster, and/or stucco while maintaining desirable viscosity levels such that the PCM-modified materials may be applied and/or worked in connection with conventional equipment and/or application processes. The physical workability of the PCM-modified paint, plaster, and/or stucco coatings may be similar to their non-PCM coating counterparts so that no additional training or specialized equipment is required, ensuring easier adoption of this novel coating technology.

Figure 8:
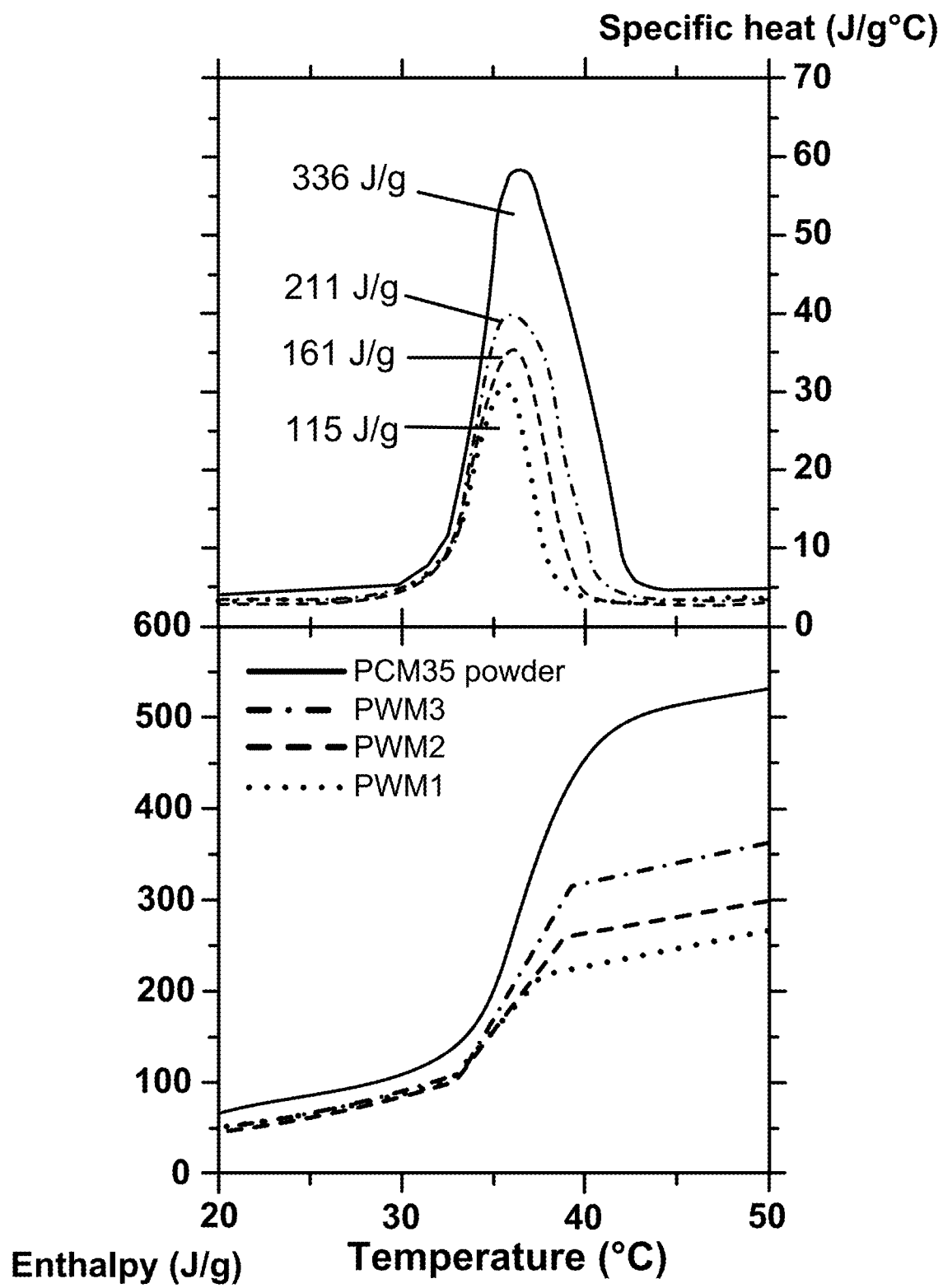
FIG. 8 illustrates specific heat and enthalpy performance of exemplary materials in accordance with various embodiments.

Additionally, FIG. 8 illustrates desirable thermal performance characteristics of exemplary PCM-modified materials disclosed herein. Specifically, FIG. 8 shows the incremental increase in thermal capacity of PCM-paint coatings as the amount of PCM that is incorporated increases. These coatings may be compared with pure PCM to observe any differences in thermal characteristics.

Figure 9A:
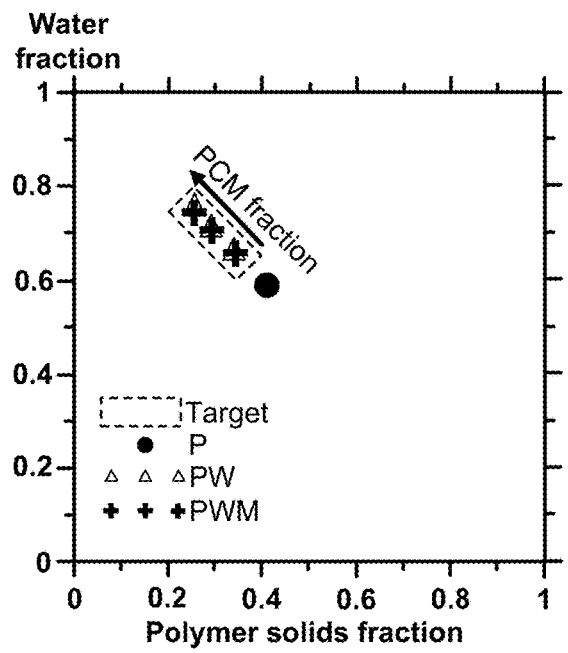
FIGS. 9A, 9B, and 9C illustrate exemplary material ratios for exemplary PCM products in accordance with various exemplary embodiments.
Figure 9B:
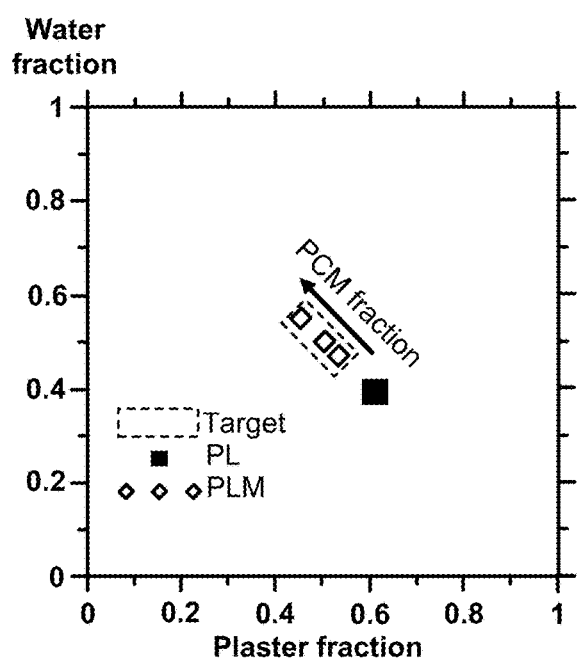
Figure 9C:
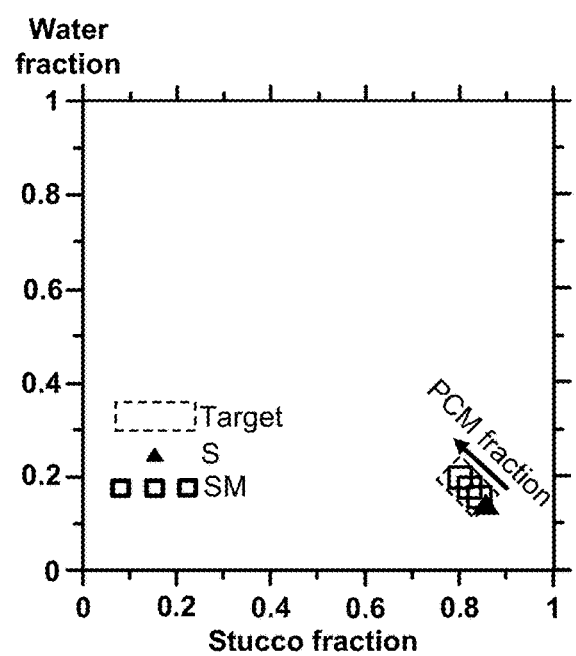

Moreover, FIGS. 9A, 9B, and 9C further illustrate desirable thermal performance characteristics of exemplary PCM-modified materials disclosed herein. Specifically, each demonstrate the water and base coating material fractions which determine a suitable amount of PCM to be incorporated. A purpose of the material fractions is to maintain similar physical characteristics with traditional commercially available insulating materials.

Figure 10A:
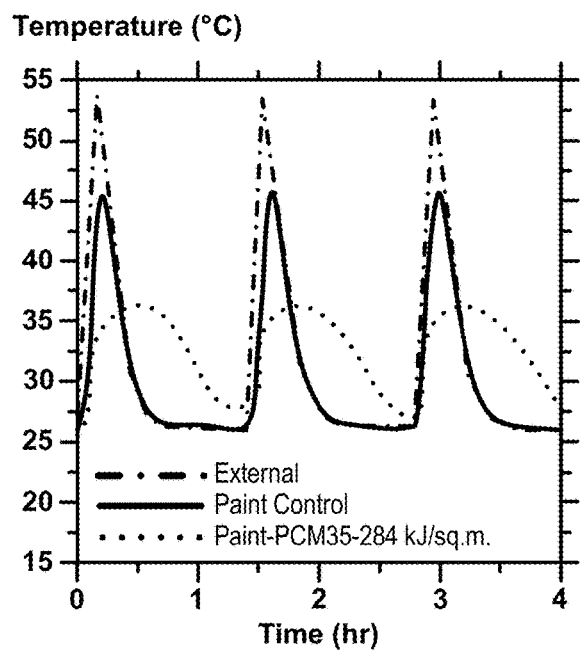
FIGS. 10A, 10B, and 10C illustrate thermal performance of exemplary PCM products in accordance with various embodiments.
Figure 10B:
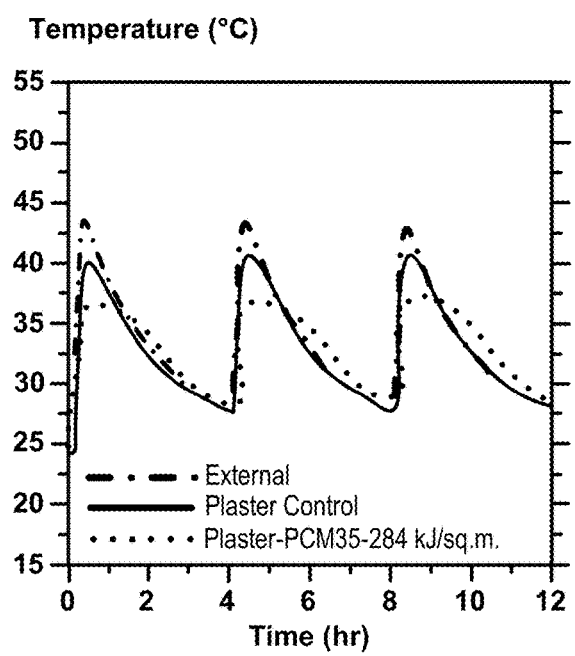
Figure 10C:
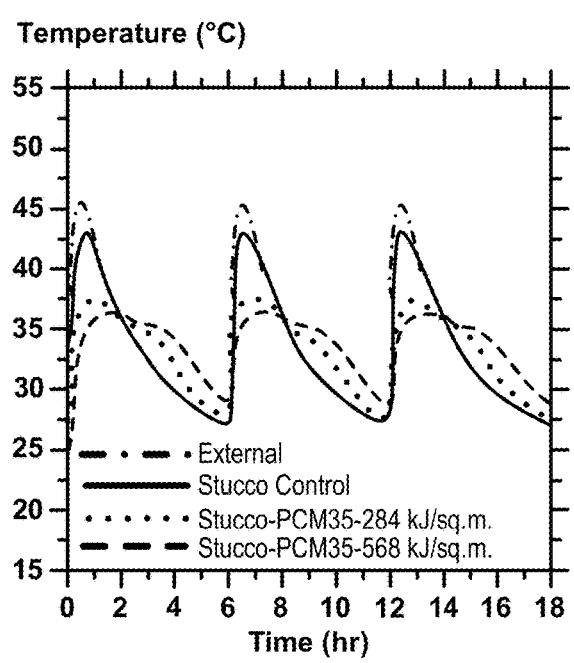

Further, FIGS. 10A, 10B, and 10C also illustrate desirable thermal performance characteristics of exemplary PCM-modified materials disclosed herein. Specifically, each show plots representing the results of testing performed within the environmental chamber, as disclosed in FIG. 3. The plots represent the superior thermal performance of PCM coatings against their respective controls which do not contain PCM.

Like FIG. 5, the PCM coatings show a significant reduction and delay in the peak temperature. Via application of principles of the present disclosure, traditional commercially available coatings are now able to provide insulative thermal properties while still maintaining their physical properties.

Figure 11:
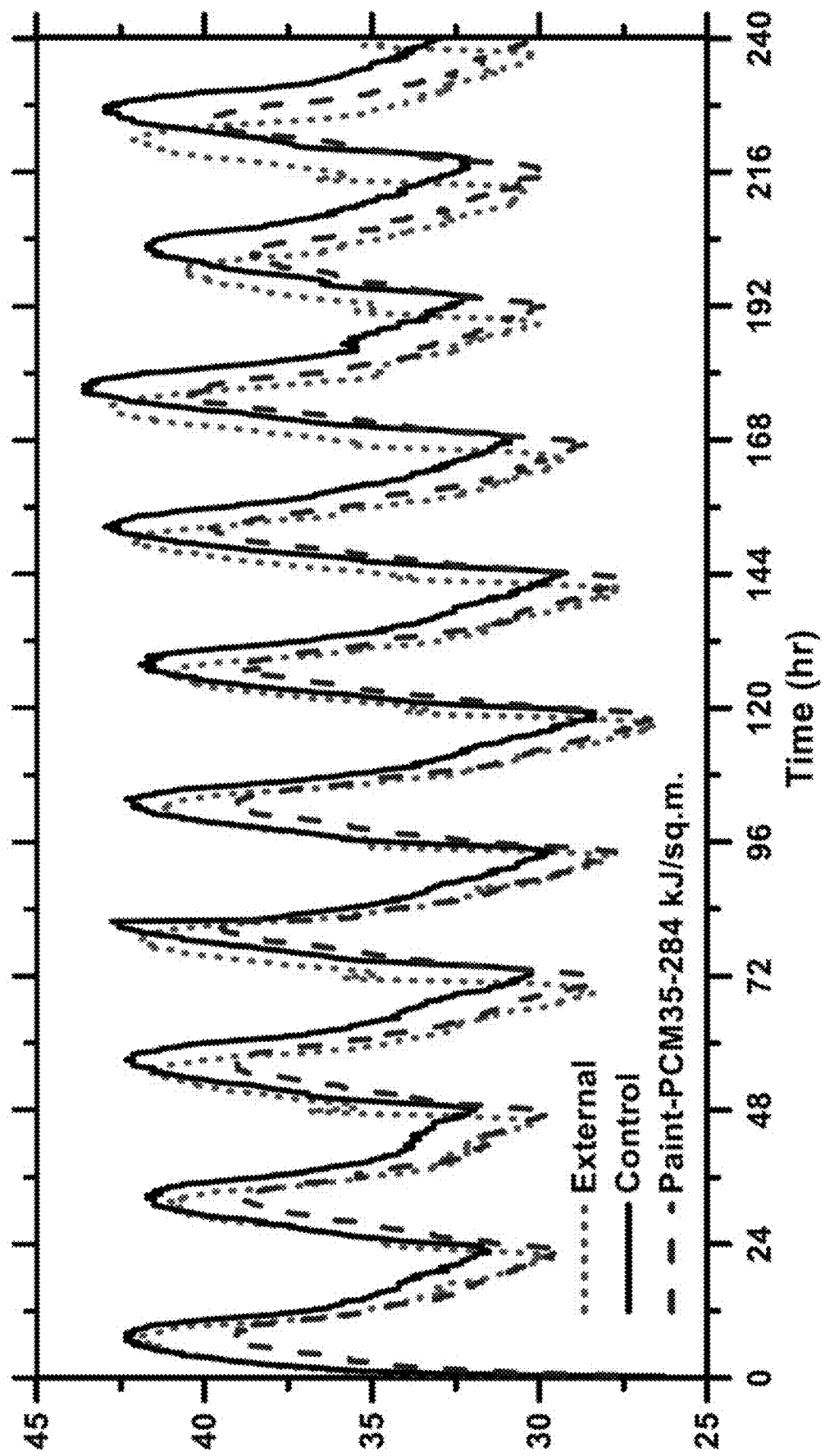
FIG. 11 illustrates thermal performance of an exemplary PCM product in accordance with various embodiments.

Yet further, FIG. 11 illustrates desirable thermal performance characteristics of exemplary PCM-modified materials disclosed herein. Specifically, FIG. 11 demonstrates the results of small field scale testing of the PCM-paint coating using a phase transition temperature of 35 degrees Celsius. The peak reduction and delay in temperature is again observed under actual ambient temperature conditions for multiple heating and cooling cycles.

Figure 12:
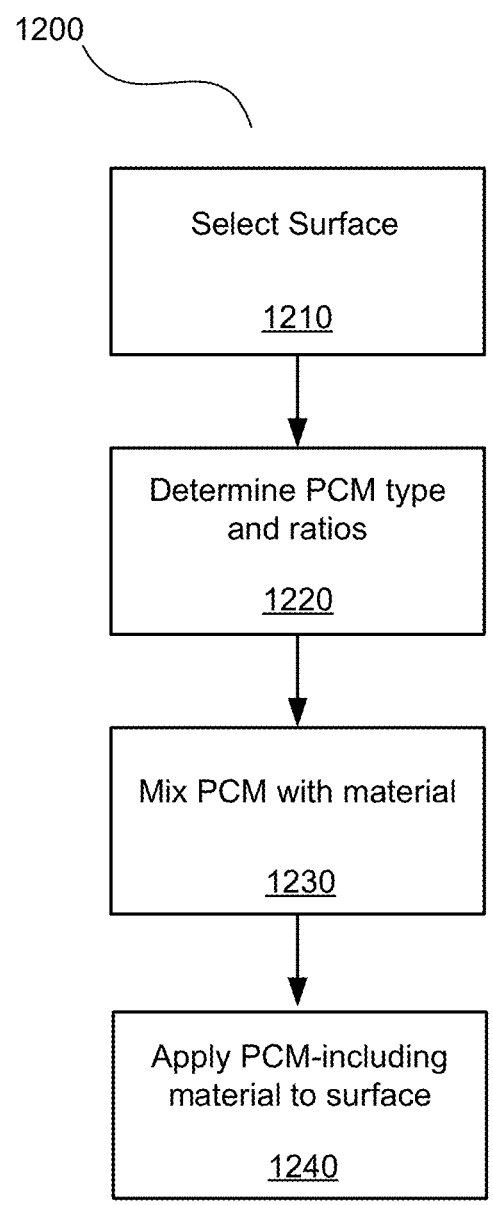
FIG. 12 illustrates a method for use of a PCM product in accordance with various embodiments.

Turning now to FIG. 12, in various exemplary embodiments a method 1200 for treating a surface with PCM may be utilized. The method may include selecting a surface for treatment (step 1210), determining a particular PCM type, amount, ratios, and so forth for the treatment material in light of desired thermal performance of the treated surface (step 1220), mixing the PCM with the base material (step 1230), and applying the PCM-modified material to the target surface (step 1240). A PCM may be selected based on the environmental climate conditions the building to be treated is subjected to. The PCM type, amount, ratios, etc., may then be chosen to achieve the maximum thermal efficiency for that building in that particular geographic location. Any of the foregoing treatment steps may be repeated, as desired, for example applying a second coat of PCM-modified material to the target surface. Additionally, the entire method may be repeated for a particular target surface with different materials, ratios, and so forth, such that a surface may receive (for example) a first treatment with a first type of PCM, and thereafter a second treatment with a second type of PCM. In this manner, the overall thermal characteristics of the treated surface may be significantly modified and/or customized, as desired.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used in the description and the appended claims, the singular forms "a," "an" and "the" are used interchangeably and intended to include the plural forms as well and fall within each meaning, unless the context clearly indicates otherwise. Also, as used herein, "and/or" refers to and encompasses any and all possible combinations of one or more of the listed items, as well as the lack of combinations when interpreted in the alternative ("or"). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A formulation for phase change material (PCM)-composite coating, the formulation comprising:
    an amount of acrylic latex-based paint having a mass fraction range of about 0.25 to about 0.60, wherein the acrylic latex-based paint comprises a binder comprising polymer solids, a filler, a pigment, and a first amount of water;
    microencapsulated PCM having a PCM-to-paint mass ratio of between 0.01 to 0.4, wherein the microencapsulated PCM comprises an organic PCM powder contained within spherical polymer microcapsules, and the organic PCM powder has a median particle size of between 10 μm and 100 μm and a phase transition temperature of between about 24 degrees Celsius and about 40 degrees Celsius; and
    the formulation further comprises a second amount of water in the acrylic latex-based paint and the microencapsulated PCM so that a mass fraction of a total amount of water including the first amount of water and the second amount of water is between about 0.1 and about 0.75.

2. The formulation of claim 1, wherein the microencapsulated PCMs comprise a cake.

3. The formulation of claim 1, wherein the microencapsulated PCMs comprise a slurry.

4. The formulation of claim 1, wherein the organic PCM powder is configured to have a phase transition temperature of about 24 degrees Celsius.

5. The formulation of claim 1, wherein the organic PCM powder is configured to have a phase transition temperature of about 35 degrees Celsius.

6. The formulation of claim 4, wherein the median particle size is about 20 μm.

7. The formulation of claim 5, wherein the median particle size is about 50 μm.

8. The formulation of claim 1, wherein the formulation comprises a total polymer solids mass fraction of 0.44 and a total water mass fraction of 0.56, and wherein the formulation achieves a similar consistency as traditional latex-based paint.

9. The formulation of claim 8, wherein the microcapsules of the microencapsulated PCM are spherical in shape without agglomerations.

10. The formulation of claim 9, wherein the formulation is configured with a thermal energy storage capability of about 284 kilojoules per square meter.

11. The formulation of claim 1, wherein the mass fraction of the total amount of water is between 0.40-0.75.

12. The formulation of claim 11, wherein an initial mass fraction of the polymer solids of the amount of acrylic latex-based paint is about 0.41 and an initial mass fraction of the first amount of water is about 0.59.

13. The formulation of claim 12, wherein the PCM-to-paint mass ratio is about 0.33.

14. The formulation of claim 13, wherein the second amount of water comprises a mass fraction of about 0.28 so that a total mass fraction of the polymer solids is 0.44 and the total water mass fraction is 0.56.

* * * * *